United States Patent [19]

Hanaoka

[11] Patent Number: 4,464,067
[45] Date of Patent: Aug. 7, 1984

[54] THERMISTOR FREQUENCY CONTROLLED ELECTRONIC THERMOMETER

[75] Inventor: Tadashi Hanaoka, Tanashi, Japan

[73] Assignee: Citizen Watch Company Limited, Tokyo, Japan

[21] Appl. No.: 460,085

[22] Filed: Jan. 21, 1983

[30] Foreign Application Priority Data

Jan. 22, 1982 [JP] Japan .................................. 57-8649
Feb. 9, 1982 [JP] Japan .................................. 57-19162

[51] Int. Cl.³ .......................... G01K 7/24; G05B 11/26
[52] U.S. Cl. ..................................... 374/170; 331/66; 331/DIG. 3; 364/557
[58] Field of Search ............... 374/183, 185, 170, 171; 364/557; 331/66, DIG. 3

[56] References Cited

U.S. PATENT DOCUMENTS 3,949,608  4/1976  Abbey et al. ................... 364/557 X
4,199,986  4/1980  Gansimeier et al. ............ 374/183 X
4,341,117  7/1982  Goldstein et al. ................. 374/170
4,359,285 11/1982  Washburn ......................... 331/66 X
4,370,070  1/1983  Leroux .............................. 374/170
4,370,731  1/1983  Sasaki et al. .................... 374/170 X
4,371,271  2/1983  Bellet et al. ...................... 331/66 X Primary Examiner—Daniel M. Yasich
Attorney, Agent, or Firm—Jordan and Hamburg

[57] ABSTRACT

A thermometer is disclosed which utilizes a thermistor as a temperature sensor, controlling the frequency of oscillation of an oscillator circuit. The output pulses from that circuit are frequency-divided during a fixed time interval by a variable frequency divider circuit, with the division ratio being successively varied during that interval in accordance with the cumulative number of pulses output from the variable frequency divider circuit, counted by a counter circuit, with the variations of the frequency division ratio being such as to accurately compensate for the non-linear temperature/resistance characteristic of the thermistor. The cumulative count of pulses output from the variable frequency divider circuit at the end of the fixed time interval is proportional to temperature, and is displayed as temperature by a digital display. The thermometer is suited to mass-production low-cost manufacture, yet can be miniaturized, lightweight and accurate.

15 Claims, 22 Drawing Figures

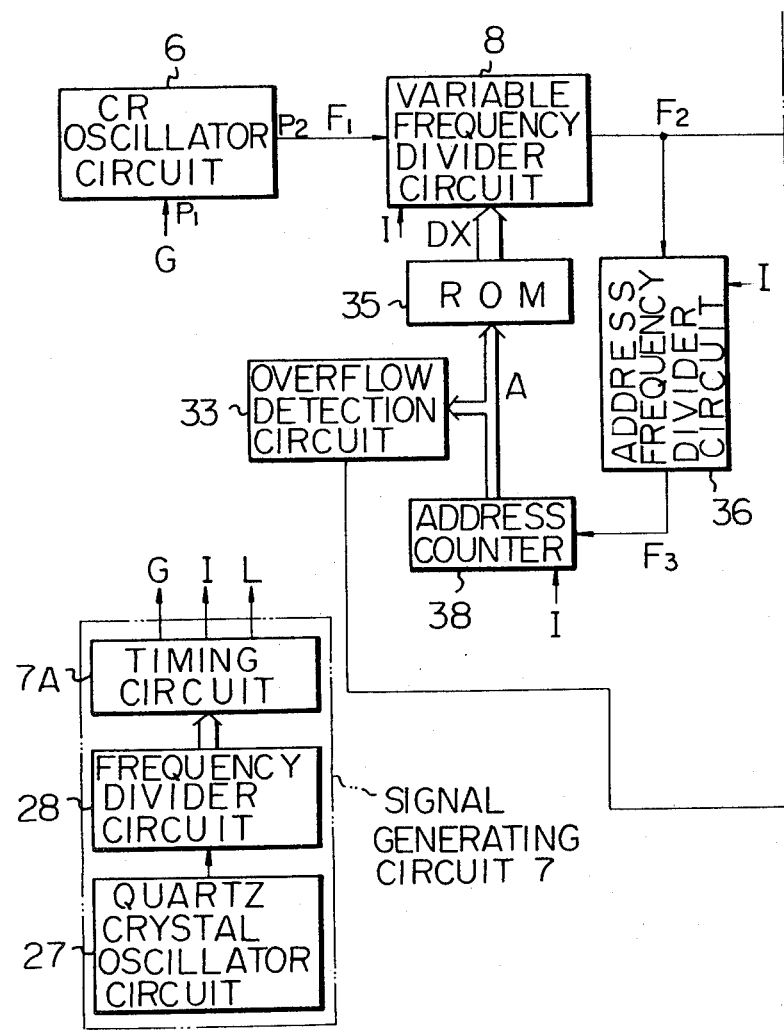

THERMISTOR FREQUENCY CONTROLLED ELECTRONIC THERMOMETER

BACKGROUND OF THE INVENTION

The present invention relates to a thermometer which converts changes in the resistance of a thermistor into changes in a frequency, by utilizing the thermistor in a capacitance-resistance (abbreviated in the following to CR) oscillator circuit and which performs temperature measurement by measuring that frequency.

It is an objective of the present invention to use the exponential changes in the resistance of a thermistor with respect to temperature, to produce an inexpensive and highly accurate thermometer which has a fixed sensitivity over a wide temperature range, and to thereby implement a small size thermometer which can be built into an electronic wristwatch.

Hitherto, the most widely used types of thermometer have been formed of a glass tube with mercury or colored alcohol sealed therein, and which employ the expansion of such a fluid. Such glass thermometers are light and comparatively inexpensive, but on the other hand, if they are made very small in size then the displayed temperature becomes difficult to read, and the accuracy becomes poor as a result. Another type of inexpensive and lightweight thermometer is the bimetal type. However this has the disadvantages of low accuracy and of being very weak and easily damaged if it is made small in size.

Another type of thermometer, used for high-grade applications, is the electrical thermometer which utilizes a thermocouple as a temperature sensing element. In recent years, such thermometers have been equipped with digital temperature display means, for use as digital thermometers, and are widely used in scientific and industrial temperature measurement applications. However due to the high cost of such devices, they are not suitable for general use, e.g. as domestic thermometers. Thermometers based on various other principles have been produced, however none of these combines high accuracy, light weight, and low cost, such as to be suited for use as a general purpose thermometer.

The present invention enables a thermometer to be produced which has a high degree of accuracy, comparable to that of a prior art specialized electronic thermometer, an easily legible display, and possesses advantages such as light weight and low manufacturing cost which are comparable to those of glass rod or bimetal type thermometers. A thermometer according to the present invention uses a thermistor as a temperature sensor. The term "thermistor" is applied to resistive elements whose resistance value varies with changes in temperature. However in the present specification, the term thermistor refers to a negative temperature coefficient thermistor comprising a sintered metal oxide body provided with electrodes. The resistance of a thermistor is extremely sensitive to changes in temperature, and can be freely selected. In addition, such a thermistor can be simple in shape and small in size. Thus, the thermal time constant can be small, and so thermistors are highly suited to measurement of rapidly changing temperatures. In addition to these advantages, thermistors are highly suited to mass production manufacture. However, since the resistance of a thermistor changes in an exponential manner with respect to to temperature, it possesses the disadvantage that it is necessary to convert the exponential characteristic to provide a linear variation with temperature, by some form of compensation.

Hitherto, the following two methods have been adopted for this linearity compensation. In one method, the thermistor is connected in parallel with a resistor, so that the temperature/resistance of the combination is approximately linear. However with such a method, large numbers of highly accurate resistors are required, and the temperature range over which compensation can be applied is narrow, while the accuracy of linearity compensation is comparatively poor. Due to this relatively poor accuracy, such thermometers have only been used for applications which cover only a narrow range of temperature, such as for room heating and cooling systems, etc.

With the second method of thermistor linearity compensation, the resistance of the thermistor is accurately measured, and is converted into a digital value by an A-D converter. Linearity compensation is then applied by computer means. Such a method requires a large amount of equipment, and due to the high cost, it is limited to thermometers for scientific applications.

For the above reasons, thermistors have been used primarily as sensors for detection of specific temperature points, rather than in thermometers. With the present invention, however, linearity compensation is applied to the temperature versus resistance characteristic of a thermometer by means which are light in weight, yet which provide a high degree of accuracy, as will be explained in the following.

SUMMARY OF THE INVENTION

The present invention comprises a resistance-capacitance type of oscillator circuit, having a thermistor serving as all or part of the resistive elements of a frequency-determining time-constant network. The oscillator is set in operation during a fixed time interval (or periodically during a succession of such time intervals) and the output signal from the resistance-capacitance (hereinafter RC) osillator circuit is frequency divided by a variable division ratio frequency divider circuit, whose division ratio can be freely preset by means of data provided from division ratio setting circuit means. The pulses of the output signal from this variable frequency divider circuit are counted by a counter circuit. Each time the number of pulses output from the variable frequency divider circuit has increased by a fixed amount, then a signal is output from the counter circuit which causes the division ratio setting means to alter the division ratio of the variable frequency divider circuit. The counter circuit also serves to count the cumulative number of pulses output from the variable frequency divider circuit during the fixed time interval (referred to as the oscillation interval) of operation of the CR oscilator. By presetting a suitable initial count value into the counter circuit prior to each oscillation interval, and by suitable choice of the fixed amount of pulses referred to above whereby the division ratio is successively changed during an oscillation interval, the cumulative count in the counter circuit at the end of an oscillation interval will be accurately proportional to ambient temperature, and can be displayed in digital form as a temperature value.

DESCRIPTION OF THE PREFERRED EMBODIMENTS

Figure 1:
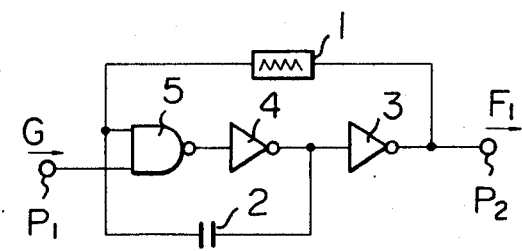
FIG. 1 shows a circuit diagram of an oscillator circuit incorporating the present invention.

FIG. 1 is a circuit diagram of an embodiment of a CR oscillator circuit used in an embodiment of the present invention. This oscillator circuit comprises a thermistor 1, a capacitor 2, two CMOS inverters 3 and 4, and a CMOS NAND gate 5. The output terminal of NAND gate 5 is coupled to the input terminal of inverter 4, and the output of inverter 4 is coupled to the input of inverter 3. The output from CR oscillator circuit 1, designated as pulse signal F1 appears on output terminal P2 of inverter 3.

A control signal G is applied to the input terminal P1 of NAND gate 5. The second input terminal of NAND gate 5 is coupled to terminals of thermistor 1 and capacitor 2. The other terminal of thermistor 1 is coupled to output terminal P2 of inverter 3, while the other terminal of capacitor 4 is coupled to the output terminal of inverter 4.

With the above circuit configuration, when control signal G applied to input terminal P1 goes to the low logic level (hereinafter abbreviated to L logic level) then operation of the CR oscillator circuit is halted, and signal F1 from output terminal P2 is held at the high logic level (abbreviated hereinafter to H level), with unnecessary power dissipation being thereby prevented. When control signal G goes to the H logic level, then the CR oscillator circuit is set in operation, and pulse signal F1 is thereby output, having a frequency f1 which is determined by the resistance value R of thermistor 1 and the capacitance value C of capacitor 2 in accordance with the following relationship:

$$f1 = 1/2.2CR \qquad (1)$$

If the resistance R of thermistor 1 with respect to the absolute temperature scale, at a reference temperature T0 (°K.), is designated as Ro, and if the thermistor constant is designated as B, then the resistance value R of the thermistor at an absolute temperature T(°K.) is given by the following equation:

$$R = Ro \, \exp B(1/T - 1/To) \qquad (2)$$

Combining equation (1) with equation [2], the following equation is obtained:

$$f1 = \frac{1}{2.2 \, CRo \, \exp\{B(1/T - 1/To)\}} \qquad [3]$$

$$= \frac{\exp(B/To)}{2.2 \, CRo \, \exp(B/T)} = ke^{-B/T}$$

where $k = \frac{1}{2.2 \, CRo} \, e^{B/To}$ \qquad [4]

The frequency f1 is obtained from equation 3, and the corresponding value of temperature T can be obtained from the following equation;

$$T = \frac{B \log e}{\log k - \log f1} \qquad [5]$$

The number of pulses N of signal F1 which occur within the specific time interval t0 is given by the following equation;

$$N = f1 \cdot to \qquad [6]$$

From equations 5 and 6, the following equations can be derived:

$$T = \frac{B \log e}{\log k - \log N/to} = \frac{B \log e}{\log kto - \log N} \qquad [7]$$

The value of temperature T can be obtained from equation 7, if the number of pulses N is known. The graph corresponding to this equation has the form shown in FIG. 2. Although this is a simple continuously increasing curve, relatively high-level computation facilities are required to compute values from equation 7. For this reason, approximate values for temperature T are computed with the present invention, by means of a circuit which provides straight straight line segment approximations to the graph of FIG. 2.

Figure 3:
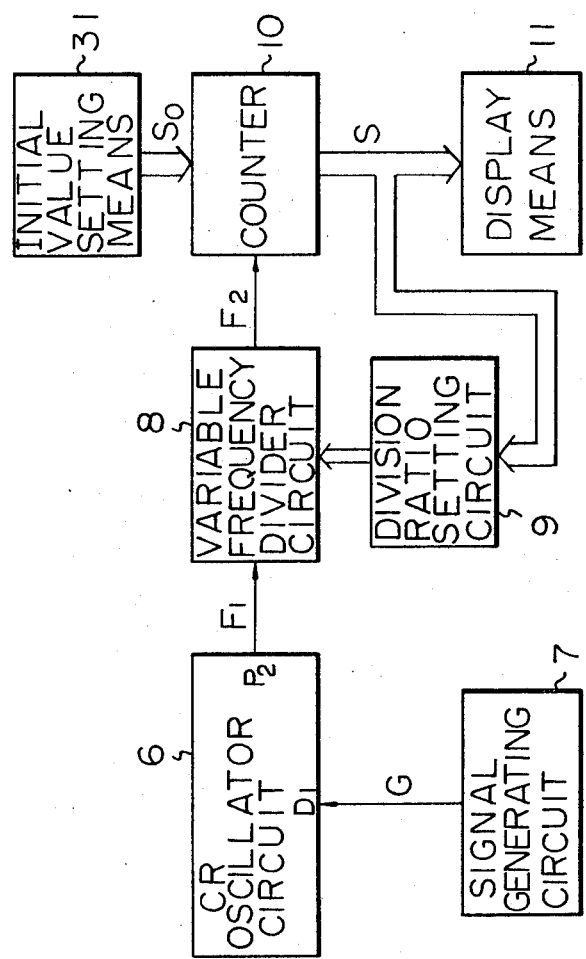
FIG. 3 is a block diagram showing the principles of operation of one embodiment of the invention.

FIG. 3 is a block circuit diagram for describing the principles of operation of an embodiment of a thermometer according to the present invention, and includes the circuit referred to above for producing straight line segment graph characteristics. In the figure, CR oscillator circuit has the configuration shown in FIG. 1. A control signal G which goes to the H logic level during a fixed oscillation time interval t0 is applied to input terminal P1 of CR oscillator circuit from signal generator circuit. A pulse signal F1 is output from terminal P2. This signal is input to a variable division ratio frequency divider circuit 8, and is frequency divided thereby with a division ratio X, whose value is determined by a division ratio setting circuit 9.

A pulse signal F2 is thereby output from variable division ratio frequency divider circuit 8, and is input to a counter circuit circuit 10 to be counted thereby. The count content S of counter circuit 10 is transferred to display device 11, and is displayed thereby, and is also transferred to be input to division ratio setting circuit 9. The division ratio setting circuit 9 is designed such as to set the frequency division ratio X of variable division ratio frequency divider circuit 8 to a different value each time a fixed amount of change (designated in the following as A) occurs in the count value S. The frequency division ratio X is the ratio of the frequencies f1 and f2 of signals F1 and F2, i.e.: $X=f2/f1$. Thus, X is a constant.

The initial value setting means 31 serves to set an initial value S0 into counter circuit 10 when a temperature measurement operation is initiated, and can comprise means such as a mask ROM (read-only memory).

When control signal G is at the L logic level, signal F1 is held at the H level, which is the condition immediately prior to a temperature measurement operation. In addition, the initial value S0 is preset into contr 10 by initial value setting means 31, and the frequency division ratio X1 is set by division ratio setting circuit 9 in accordance with this initial value S0. At this time, display device 11 will have memorized therein temperature data which was produced during the preceding measurement operation, and will be displaying that data. When control signal G goes to the H logic level, then the CR oscillator circuit 6 begins oscillation, pulse signal F1 is applied to variable division ratio frequency divider circuit 8, and a temperature measurement operation begins.

Figure 2:
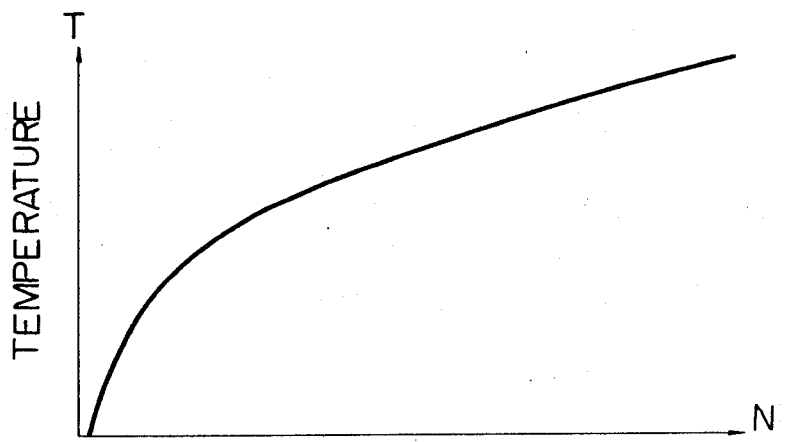
FIG. 2 is a graph of temperature versus the number of pulses (n) of FIG. 1.
Figure 4:
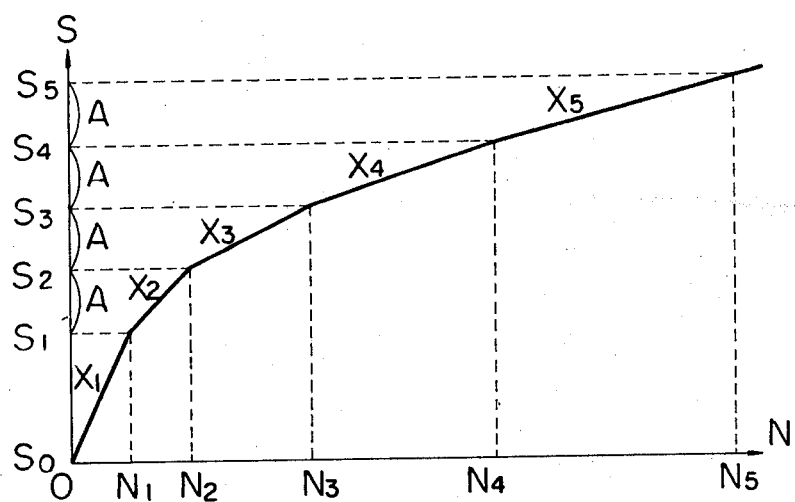
FIG. 4 is a graph produced by the circuit of FIG. 3.

FIG. 4 is a straight line segment graph which is an approximation to the graph of FIG. 2 and is produced by the circuit of FIG. 3. The number of pulses N of signal F1 which are input to variable division ratio frequency divider circuit 8 shown along the horizontal axis, while the count content S of counter circuit 10 is shown along the vertical axis. The block circuit diagram of FIG. 3 will now be described with reference to the graph of FIG. 4. Firstly, by the time the number of pulses N input to variable division ratio frequency divider circuit 8 has reached a value N1, then N1·X1 pulses will have been input to counter circuit 10, and the count contents S will have reached S1. The change in count contents S which takes place during this time is indicated by the straight line segment designated by the frequency division ratio X1. When the count contents S exceeds S1, then a new frequency division ratio X2 is set by division ratio setting circuit 9, with the value X2 being less than X1. As a result, the rate of change of count contents S becomes more gradual. Thereafter, during a time interval in which the number of pulses N goes to a value N2, the count contents S increases until it has been incremented by the amount A, with this new count contents value being designated as S2. The change in count contents S which occurs during this time corresponds to the straight line segment X2 shown in the graph of FIG. 4.

Thereafter, as the number of pulses N increases to N3, N4, N5, . . . , the count contents S is successively increased by the fixed amount A, to become S3, S4, S5, . . . respectively, while the frequency division ratio X correspondingly tkes the values X3, X4, X5, . . . respectively, becoming successivly smaller. As a result, the changes which take place in the count contents S are represented by the straight line graph segments shown in FIG. 4, such as to approximate the graph of changes with respect to temperature T shown in FIG. 2. The value of the count content S in counter circuit 10 therefore approximately corresponds to temperature T.

A sufficiently high accuracy for this approximation is only obtained for the upper portion of the graph of FIG. 2. However the initial count value S0 can be set to correspond to the lower limit temperature of the temperature measurement range, or to a lower value. For example, if the temperature measurement range is −9.9 C. to +59.9 C., then the initial value of S0 can be set to correspond to the lower temperature limit −9.9 C., or to a lower value, e.g. corresponding to −20 C. The initial frequency division ratio X1 and the co-ordinates X1,S1 of the first break-point in the line segment graph are related in accordance with the following:

$$X1 = (S1 - S0)/N1 \tag{8}$$

It is desirable to set the value of S0 such that the value of X1 will be close to unity, to attain maximum accuracy of approximation.

The slope of the nth straight line segment of the graph, where n is an integer equal to 2 or more, (i.e. the frequency division ratio Xn), is given by the following equation:

$$Xn = \frac{Sn - Sn - 1}{Nn - N(n-1)} \tag{9}$$

In this equation, Sn and S(n−1) represent the values of count contents S corresponding to the ends of the nth straight line segment, while Nn and N(n−1) represent the values of the number of pulses N at the respective ends of the nth straight line segment. If it is assumed that this straight line segment graph approximates to the graph of FIG. 2, then the number of pulses N at temperature T, for values of Sn and S(n−1), are given by equations 5 and 6. Thus, $$Nn = to\, ke^{\frac{-B}{Sn}} \tag{10}$$

$$N(n-1) = to\, ke^{\frac{-B}{S(n-1)}} \tag{11}$$

By combining equation 9 with equations 10 and 11, the following equation is obtained;

$$Xn = \frac{Sn - S(n-1)}{to\, k \left( e^{\frac{-B}{Sn}} - e^{\frac{-B}{S(n-1)}} \right)} \tag{12}$$

The value Sn of the count contents S at the nth breakpoint of the straight line segment graph is given by the following equation:

$$Sn = (n-1)A = S \tag{13}$$

Equation 12 expresses the value of the frequency division ratio X as determined by division ratio setting circuit 9, for the case of a count contents S in counter circuit 10 being within the range S(n−1) to Sn. Since the count value in the counter circuit at each of the break points of the straight line segment graph is determined by equation 13 in accordanced with the two constants S1 and A, a series of frequency division ratios can be computed by means of equation 12. However, since the frequency versus temperature characteristic of the CR oscillator circuit 6 will deviate to some extent from that given by equation 3, it is more practical to obtain the series of values for frequency division ratio X by actual measurement of the oscillation frequency f1 of CR oscillator circuit 6 at the temperatures corresponding to each of the breakpoints in the graph.

The principles of linearity compensation for a thermistor thermometer according to the present invention have been described above. The invention will now be described with reference to a specific embodiment.

Figure 5A:
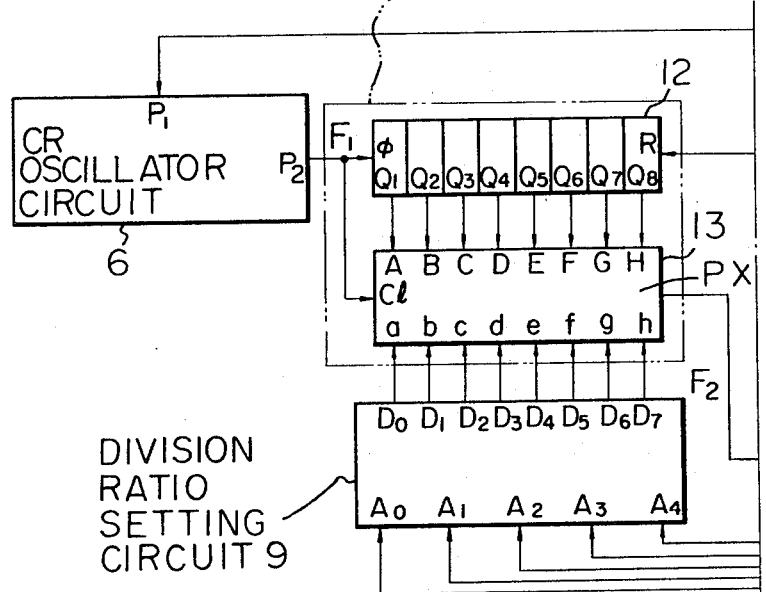
FIG. 5 shows a simplified circuit diagram in FIGS. 5A and 5B of an electronic timepiece with a built-in thermometer of the invention.
Figure 5A:
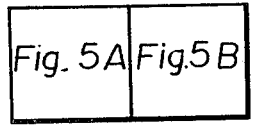
Figure 5B:
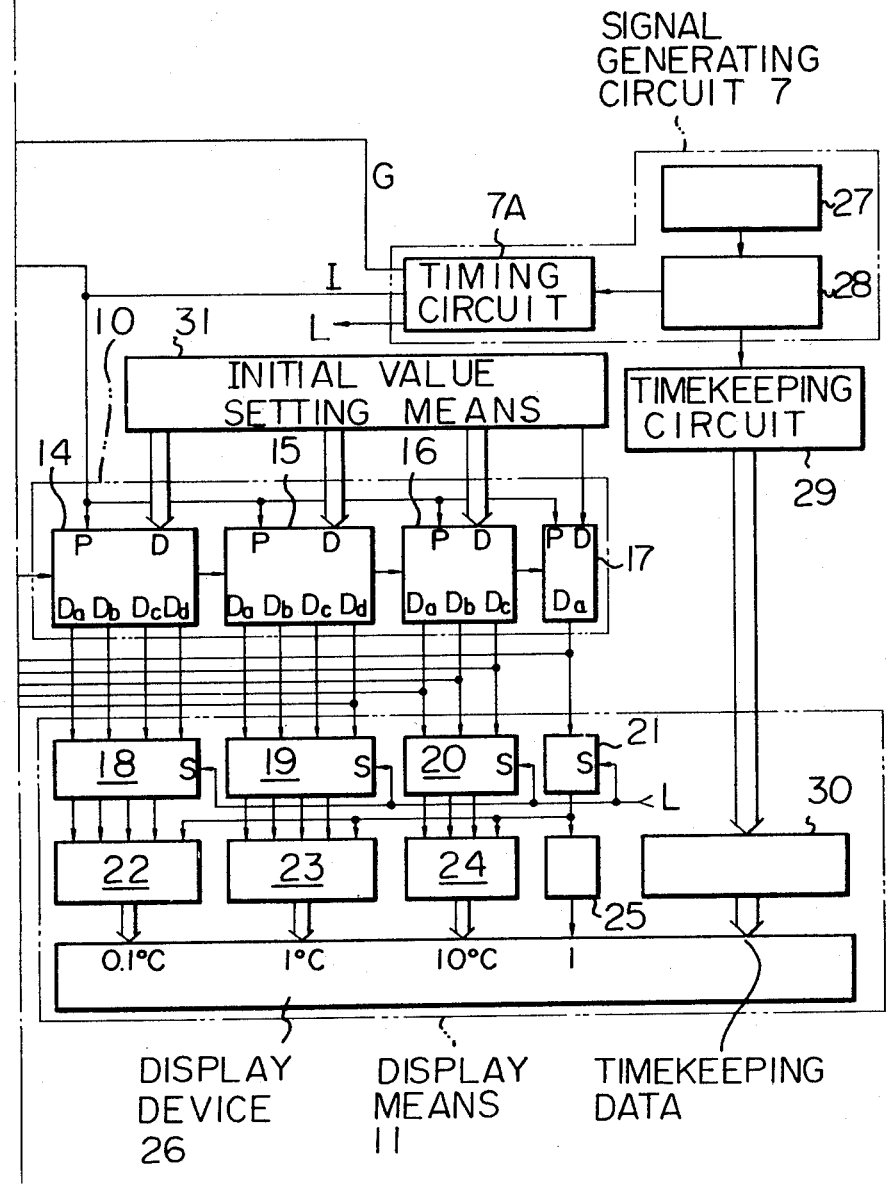

FIG. 5 is a simplified circuit diagram of an electronic timepiece equipped with a built-in thermistor thermometer according to the present invention. In this circuit, the timepiece functions are performed by a quartz crystal oscillator circuit 27, which generates a standard frequency signal, a frequency divider circuit 28 which performs frequency division of the standard frequency signal to thereby produce a timekeeping signal corresponding to the least signficant digit of the displayed time, a timekeeping circuit 29 which counts pulses of the timekeeping signal to thereby produce time information, and a decoder driver circuit 30 which receives the time information signals from timekeeping circuit 29 and converts these into a group of digital signals suitable for driving a display device. These signals are applied to drive a liquid crystal display 26. The thermometer functions are performed by a CR oscillator circuit 6, a signal generating circuit 7 comprising quartz crystal oscillator circuit 27, frequency divider circuit 28, and a timing circuit 7a. The thermometer further comprises a variable division ratio frequency divider circuit 8, a division ratio setting circuit 9, a counter circuit circuit 10, and display means 11.

The basic functions of these circuits have been generally described with reference to the block diagram in FIG. 3, in the above, but a more detailed and specific description will now be given. First, the timing circuit 7a receives an accurate timekeeping signal from frequency divider circuit 28, and controls temperature measurement operations by the thermometer by sequentially generating an initialization signal I, a control signal G, and a sampling signal L. The CR oscillator circuit 6 has the configuration shown in FIG. 2. When control signal G is at the H level, a pulse signal F1 is output from terminal P2. The variable division ratio frequency divider circuit 8 comprises 8 binary counter circuit stages connected in cascade, constituting a frequency divider circuit 12, and a logic circuit 13 having 16 input terminals designated as A, B, C, D, E, F, G, H, a, b, c, d, e, f, g, h, an input terminal CL, and an output terminal X. The frequency divider circuit 12 is provided with a reset signal input terminal R, to which the initialization signal I from timing circuit 7a is applied. The 8 output data bits Q1, Q2, Q3, Q4, Q5, Q6, Q7 and Q8 are connected to input terminals A,B, C, D, E, F, G and H respectively, of logic circuit 13, while the pulse signal F1 output from CR oscillator circuit 6 is applied to input terminal CL of logic circuit 13 and to input terminal $\phi$ of frequency divider circuit 12.

In addition, the output data bits T0 to T7 of division ratio setting circuit 9 are connected to the input terminals a to h respectively of logic circuit 13. The logic value of signal F2, which appears on output terminal X, expressed in terminals of the signals apaplied to the input terminals of logic circuit 13, is given by the following logical equation:

$$X = Cl(\overline{A}.h + A.\overline{B}.g + A.B.\overline{C}.f + A.B.C.\overline{D}.e + \quad [14]$$
$$A.B.C.D.\overline{E}.d + A.B.C.D.E.\overline{F}.c +$$
$$A.B.C.D.E.F.\overline{G}.b + A.B.C.D.E.F.G.\overline{H}.a)$$

With the logic value of signal F2 being in accordance with the conditions of equation 14, the number of times that the logic value X goes to the H logic level during a single cycle of operation of the entire frequency divider circuit 12, i.e. the number of pulses Y of signal F2 produced during that time, is given by the following equation;

$$Y=2^7.h+2^6.g+2^5.f+2^4.e+2^3d+2^2.C+2^1.b+2^0.a \quad [15]$$

In the above, signals a, b, c, d, e, f, g, and h are replaced by a 1 if the corresponding signal is at the H logic level and is replaced by a 0 if the corresponding signal is at the L logic level.

On the other hand, 256 pulses of signal F1 are output during one cycle of operation of the entire frequency divider circuit 12. Thus, the value of frequency division ratio X, which is the ratio of these two numbers of pulses, is given by the following equation;

$$X=Y/256 \quad [16]$$

The numeric value Y is set by division ratio setting circuit 9 as an 8-bit binary number, with signal a being the LSB and signal h being the MSB, i.e. Y is an integer within the range 0 to 255.

The variable division ratio frequency divider circuit 8 described in detail above is, in this embodiment a type of circuit referred to as a rate multiplier circuit. The number of binary divider stages in frequency divider circuit 12, which is the most important part of this rate multiplier circuit, serves to determine the resolution of frequency division setting by the rate multiplier circuit. In the case of a thermometer according to the present invention, it is preferable that frequency divider circuit 12 should have 7 binary divider stages, i.e. to produce 7 bits as output, in order to attain a practical level of measurement accuracy.

Counter 10 acts to count the number of pulses of signal F2 which are output from variable division ratio frequency divider circuit 8. In this embodiment, counter circuit 10 comprises two decimal counter circuit circuits 14 and 15, and an octal counter circuit circuit 16, together with a binary counter circuit 14. The counter circuits 14, 15 and 16 are connected in cascade, and correspond to the 0.1 degree digit, the units degrees digit, the tens degrees digit, and the sign (i.e. positive or negative), respectively. Each of these counter circuits is provided with a data input terminal D to which initialization data is input from initial value setting means 31, and a preset signal input terminal P, for controlling input of the latter data. The data applied to the data input terminal D of each counter circuit is preset therein as an initial value S0, when the initialization signal I is applied to the preset signal input terminal P.

Each of the decimal counter circuits 14 and 15 is provided with a set of 4 numeric data output terminals, Da, Db, Dc and Dd, with a signal being produced from each terminal, with these signals being designated in the following by the corresponding terminal designation. The numeric data which is output as these signals Da, Db, Dc and Dd is in excess-3 binary-coded decimal form. The logic levels which are taken by the sign data output terminal Da of counter circuit 17 is shown in Table 1, which also shows a truth table for the decimal counter circuits 14 and 15.

TABLE 1

| COUNTER 14.15 | 1 | | | | | | | | | | 0 | | | | | | | | | |
|---|---|---|---|---|---|---|---|---|---|---|---|---|---|---|---|---|---|---|---|---|
| COUNTER 17 | 1 | | | | | 0 | | | | | 1 | | | | | 0 | | | | |
| Dd | 1 | 1 | 1 | 1 | 1 | 0 | 0 | 0 | 0 | 0 | 1 | 1 | 1 | 1 | 1 | 0 | 0 | 0 | 0 | 0 |
| Dc | 1 | 0 | 0 | 0 | 0 | 1 | 1 | 1 | 1 | 0 | 1 | 0 | 0 | 0 | 0 | 1 | 1 | 1 | 1 | 0 |
| Db | 0 | 1 | 1 | 0 | 0 | 1 | 1 | 0 | 0 | 1 | 0 | 1 | 1 | 0 | 0 | 1 | 1 | 0 | 0 | 1 |
| Da | 0 | 1 | 0 | 1 | 0 | 1 | 0 | 1 | 0 | 1 | 0 | 1 | 0 | 1 | 0 | 1 | 0 | 1 | 0 | 1 |
| 10 DECIMAL | 9 | 8 | 7 | 6 | 5 | 4 | 3 | 2 | 1 | 0 | −0 | −1 | −2 | −3 | −4 | −5 | −6 | −7 | −8 | −9 |

The octal counter 16 is provided with three numeric data output terminals, i.e. Da, Db and Dc, with signals having corresponding names being output from these terminals. These three signals represent numeric data in octal form. Table 2 shows the logic values taken by the sign data output terminal Da of binary counter circuit 17 and the corresponding values of output data from octal counter circuit 16, When the output signal Da from binary counter circuit 17 is at the H logic level, then the contents of counter 10 represent a positive number, while when Da is at the L logic level, the count contents represent a negative number.

TABLE 2

| COUNTER 16 | 1 | | | | | | | | 0 | | | | | | | |
|---|---|---|---|---|---|---|---|---|---|---|---|---|---|---|---|---|---|
| COUNTER 17 | 1 | | | | 0 | | | | 1 | | | | 0 | | | |
| Dc | 1 | 1 | 1 | 1 | 0 | 0 | 0 | 0 | 1 | 1 | 1 | 1 | 0 | 0 | 0 | 0 |
| Db | 1 | 1 | 0 | 0 | 1 | 1 | 0 | 0 | 1 | 1 | 0 | 0 | 1 | 1 | 0 | 0 |
| Da | 1 | 0 | 1 | 0 | 1 | 0 | 1 | 0 | 1 | 0 | 1 | 0 | 1 | 0 | 1 | 0 |
| 10 DECIMAL | 7 | 6 | 5 | 4 | 3 | 2 | 1 | 0 | −0 | −1 | −2 | −3 | −4 | −5 | −6 | −7 |

The division ratio setting circuit 9 comprises a read-only memory circuit (ROM) which is provided with five address input terminals, A0, A1, A2, A3, and A4, to which output signal Dd from decimal counter circuit 15, output signals Da, Db, and Dc from octal counter circuit 16, and output signal Da from binary counter circuit 17 are input, respectively. As can be understood from the contents of Table 1 and Table 2, the five signals A0 to A4 represent five bits of binary data. Each time the count contents of decimal counter circuit 15 (representing the units of degrees digit) are increased by 5, the address which is input to the ROM circuit comprising division ratio setting circuit 9 is updated. The ROM is provide with 8 data output terminals, D0, D1, D3, D4, D5, D6 and D7, which are connected to the 8 input terminals a, b, c, d, e, f, g and h of logic circuit 13, the latter comprising a rate multiplier circuit. A binary number representing the numeric value Y is output to variable diviion ratio frequency divider circuit 8, with this numeric value Y being determined by the address input signals applied to ROM 9. In this embodiment, counter circuit 10, which is the address counter circuit for division ratio setting circuit 9, also serves as a temperature counter circuit which supplies numeric data to display means 11. The numeric data which is output from counter circuit 10 is transferred to display means 11 and is thereby displayed as a temperature value, in digital form. The display means 11 comprise a total of 12 latch circuits, each storing one bit, a decoder driver circuit producing drive signals representing three digits and a sign, and a liquid crystal display device 26 which is used to display both temperature and time.

The latch circuit section of display means 11 comprises a 4-bit latch circuit 18, for storing the numeric data from decimal counter circuit 14 representing the 0.1 degrees digit, a 4-bit latch circuit 19 for storing the numeric data from decimal counter circuit 15 representing the units of degrees digit, a 3-bit latch circuit 20 for storing the numeric data from octal counter circuit 16 representing the tens of degrees digit, and a 1-bit latch circuit 21 for storing the 1-bit data output from binary counter circuit 17, representing the sign of the temperature. Each of latch circuits 18 to 21 is provided with an input terminal S for receiving data sampling command signals. When the latch sampling signal L from timing circuit 7a is applied to the S input terminals, the data stored in the latch circuits is updated.

The decoder driver circuit section of display means 11 comprises a decoder driver circuit 22 for the 0.1 degrees digit, a decoder driver circuit 23 for the units degrees digit, and a decoder driver circuit 24 for the tens degrees digit, and a decoder driver circuit 25 for the sign. The data stored in latch circuits 18, 19, 20 and 21 is input to the decoder driver circuits 22, 23, 24 and 25 respectively.

Figure 6:
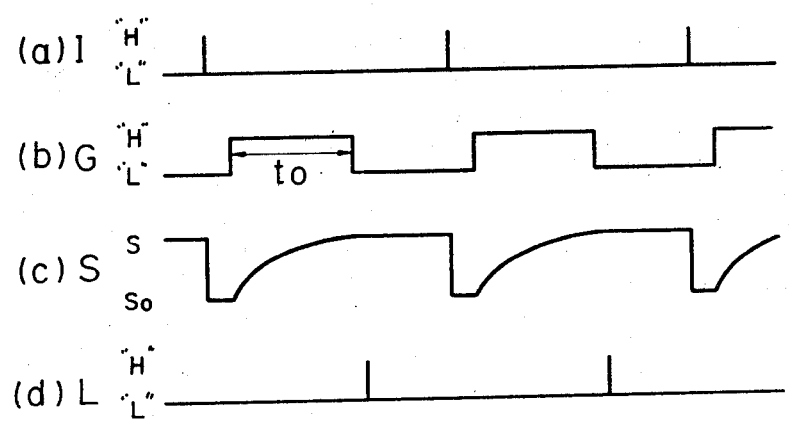
FIG. 6 are waveforms showing in FIGS. 6a, b, and c the various signals of FIG. 5.

A temperature measurement operation is initiated when an initialization signal I having the waveform shown in FIG. 6a is output from timing circuit 7a. This initialization signal I acts to reset all of the stages of frequency divider circuit 12, and in addition acts to reset the contents of counter circuit 10 to an initial value S0, as shown in FIG. 6c. Following this initialization, as shown in FIG. 6b, control signal G from timing circuit 7a goes to the H logic level, whereupon CR oscillator circuit 6 begins oscillation, and produces signal F1 as a train of pulses. Signal F1 is frequency divided by variable division ratio frequency divider circuit 8, and the frequency divided result is transferred to counter circuit 10 as pulse signal F2. The pulses of signal F2 are counted by counter circuit 10, and the count value S therein increases in accordance with the straight line segment graph of FIG. 4.

After a predetermined time interval t0, control signal G goes to the L logic level, and as a result, CR oscillator circuit 6 ceases to operate, so that the count contents of counter circuit circuit 10 at that point are held retained. Subsequently, sampling signal L, having the waveform shown in FIG. 6d, is input from timing circuit 7a, whereby the contents of latch circuits 18, 19, 20 and 21 are updated by data from counter circuit circuits 14, 15, 16 and 17. The updated data from latch circuits 18 to 21 are converted into suitable form for display by decoder driver circuits 22, 23, 24 and 25, and the digital signals thus produced are applied to liquid crystal display 26, which thereby displays temperature data. The above series of operations is repetitively performed, with a fixed period, to thereby provide accurate representation of up-to-date temperature data.

A brief description will now be given of how this thermometer embodiment displays negative temperature values, i.e. temperatures below 0 C. In this embodiment, counter circuit 10 cannot perform down counting, so that when the value of the sign bit from binary counter circuit 17 is at the L logic level, (i.e. a logic value of 0), a negative number is expressed by the complement of the numeric value stored in counter circuits 14, 15 and 16. In Table 3 below the logic level of of the output data from temperature counter circuit 17 is shown at the left, with the output signals Dc, Db and Da of the tens of degrees counter 17, output signals Dd, Dc, Db and Da of the units of degrees counter 15, and output signals Db, Dc and Dd and Da from the 0.1 degrees counter 14 being successively shown from left to right after the sign bit. in Table 3, the L logic level is designated by logic value 0, while the H logic level is designated by logic value 1. The table shows the contents of counter circuits 14, 15, 16 and 17 for the case of a temperature of +25.6 C., with the count contents values being obtained from the truth tables of Table 1 and Table 2.

TABLE 3

| COUNTER 17 | COUNTER 16 | | | COUNTER 15 | | | | COUNTER 14 | | | |
|---|---|---|---|---|---|---|---|---|---|---|---|
| Da | Dc | Db | Da | Dd | Dc | Db | Da | Dd | Dc | Db | Da |
| 1 | 0 | 1 | 0 | 1 | 0 | 0 | 0 | 1 | 0 | 0 | 1 |

Similarly, a temperature of 0 C. expressed as shown in Table 4 below.

TABLE 4

| COUNTER 17 | COUNTER 16 | | | COUNTER 15 | | | | COUNTER 14 | | | |
|---|---|---|---|---|---|---|---|---|---|---|---|
| Da | Dc | Db | Da | Dd | Dc | Db | Da | Dd | Dc | Db | Da |
| 1 | 0 | 0 | 0 | 0 | 0 | 1 | 1 | 0 | 0 | 1 | 1 |

Table 5 below illustrates how a value of −0 C. is expressed by the method of this embodiment.

TABLE 5

| COUNTER 17 | COUNTER 16 | | | COUNTER 15 | | | | COUNTER 14 | | | |
|---|---|---|---|---|---|---|---|---|---|---|---|
| Da | Dc | Db | Da | Dd | Dc | Db | Da | Dd | Dc | Db | Da |
| 0 | 1 | 1 | 1 | 1 | 1 | 0 | 0 | 1 | 1 | 0 | 0 |

In actual fact, of course, there is no real temperature value of −0 C., and it would be more precise to say that the latter value in Table 5 corresponds to a temperature of −0.1 C. However in this case, an error of 0.1 C. is sufficiently small to be ignored, and this allows negative temperature values to be very easily expressed.

The temperature value expressed by Table 6 below is precisely −5.3 C., however this is interpreted as −5.2 C. for purposes of display.

TABLE 6

| COUNTER 17 | COUNTER 16 | | | COUNTER 15 | | | | COUNTER 14 | | | |
|---|---|---|---|---|---|---|---|---|---|---|---|
| Da | Dc | Db | Da | Dd | Dc | Db | Da | Dd | Dc | Db | Da |
| 0 | 1 | 1 | 1 | 0 | 1 | 1 | 1 | 1 | 0 | 1 | 0 |

The results of the positive and negative temperature value discrimination process described above, representing the digits to be displayed, are transferred to decoder driver circuits 22, 23 and 24 of display means 11. Due to the method adopted, temperature sign data for the digit data applied to decoder driver circuits 22, 23 and 24 is provided by the output from latch circuit 21.

An embodiment of the present invention will now be described which enables both fahrenheit and centigrade temperatures to be selectively displayed.

Equation 7 can be modified to express temperature in centigrade values, i.e. as T°C., or in fahrenheit values, T°F., by utilizing the following equations 17 and 18 respectively.

$$T°C. \approx \frac{B \log e}{\log kto - \log N} - 273 \quad (17)$$

$$T°F. = \frac{9B \log e}{5(\log kto - \log N)} - 459.4 \quad (18)$$

Each of these equations 17 and 18 enables temperature to be obtained in terms of a number of pulses N output from a CR oscillator circuit such as that shown in FIG. 1 during a fixed time interval t0. However in order to obtain temperature values by using these equations, it is necessary to use a counter circuit to count number of pulses N, and a highly accurate computation circuit to compute values from these equations. This would require large-scale and expensive circuitry, so that such a method is not suitable for producing a general-purpose type of thermometer. With a thermometer according to the present invention, however, instead of using such complex and expensive circuits to compute temperature, the counter used to count number of pulses N is operated in such a way as to also perform computations which give values that approximate to those given by equations 17 and 18. This counter circuit will now be described.

Figure 7:
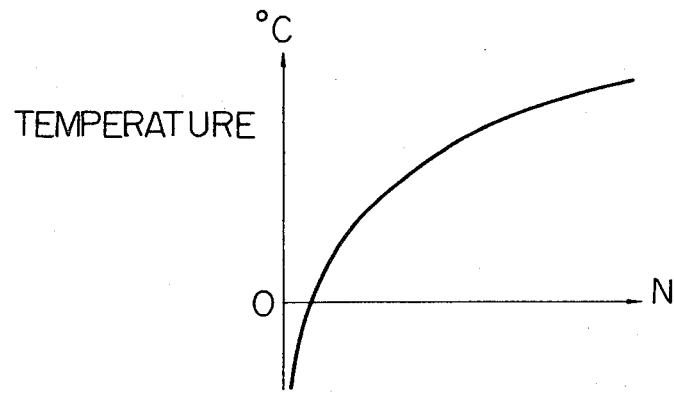
FIGS. 7, 8, 9 and 10 are graphs showing the relationship between the temperature and the number of pulses (n)

FIG. 7 is a graph corresponding to equation 17, with the number of pulses N being plotted along the horizontal axis and with centigrade temperature T°C. along the vertical axis. As in the first embodiment, a temperature counter circuit is used, which is arranged arranged such that as the total number of pulses input thereto increases, the rate of counting is accordingly decreased, so that the relationship between number of pulses N and the count contents S approximates to the relationship between number of pulses N and centigrade temperature values T°C. given by equation 17. In this way, the count contents S can be displayed as a centigrade temperature T°C.

Figure 8:
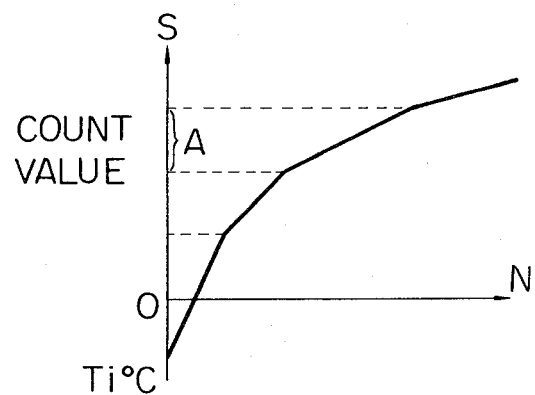

FIG. 8 shows an example of a straight line segment graph which represents the relationship between number of pulses N and the count contents S. As the number of pulses N increases, the slopes of the straight line segments successively decrease in a stepwise manner, so that the graph of FIG. 8 approximates to the curve of the graph in FIG. 7. In this example, the slope of the straight line segments varies in accordance with the count contents S. Each time S increases by a fixed amount A, the rate of counting by the counter circuit is successively decreased. The smaller the value of this fixed quantity A, the greater will be the accuracy of approximation of the straight line segment graph. An accuracy of ±0.5° C. is suitable for a general-purpose domestic thermometer, so that a value for the constant A of approximately 5° C. is suitable. The accuracy of the number of pulses N, when that number is in the region of zero, does not present a major problem. The reasons for this will now be described. As for the first embodiment, when the number of pulses N is in the region close to zero, this corresponds to a very low temperature region, which is outside the measurement temperature range of the thermometer, which is from −9.9° C. to +59.9° C. for this embodiment. It is convenient to arrange that the value of the count contents when the number of pulses N is zero will correspond for example to the lower limit temperature −9.9° C., or to a temperature which is lower than that lower limit temperature. In this way, the most suitable initial value for the particular counter circuit configuration can be preset into the temperature counter circuit. In the following description, this initial value will be designated as Ti°C., for the case of centigrade temperature measurement being performed.

Figure 9:
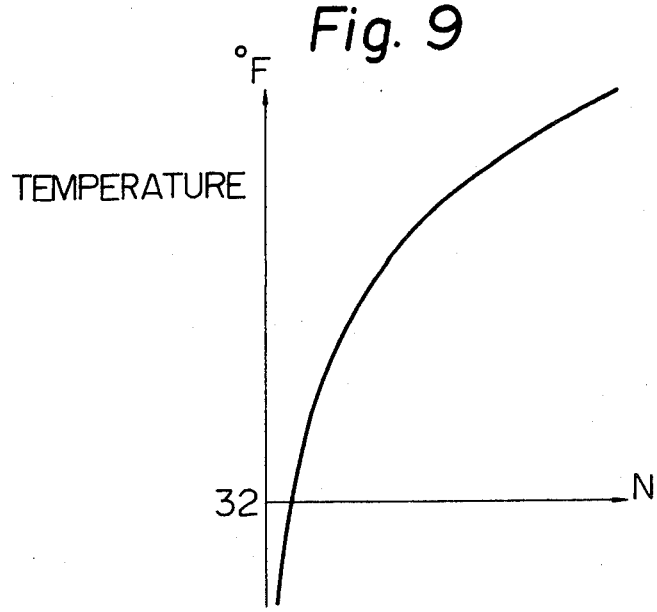

The case of measurement of a fahrenheit temperature T°F. will now be described. FIG. 9 is a graph corresponding to equation 18. This graph has a steeper slope that that of FIG. 7, for equation 17, and in addition the number of pulses which indicate a centigrade temperature T°C. will indicate a fahrenheit temperature of 32° F. This relationship between fahrenheit temperature T°F. and centigrade temperature T°C. is given by the following equation:

$$T°F. = 9/5\ T°C. + 32 \quad [19]$$

Figure 10:
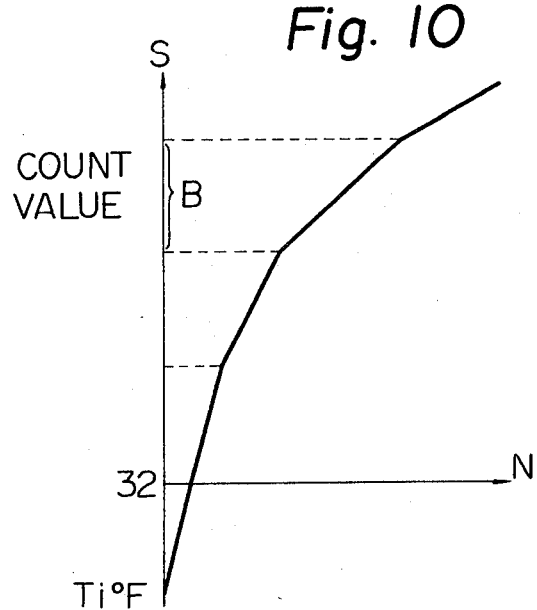

FIG. 10 shows a straight line segment approximation graph for the relationship between the number of pulses N and fahrenheit temperature T°F., which has been derived using the same methods and the same conditions as for the centigrade temperature T°C. of FIG. 9. The initial counter value Ti°F. is given as follows in this case:

$$Ti°F. = 9/5\ Ti°C. + 32 \quad [20]$$

The amount of change B in the count contents required to provide the desired change in the slope of the graph is derived from the change amount A by means of the following equation:

$$B = 9/5 A \quad [21]$$

Figure 11B:
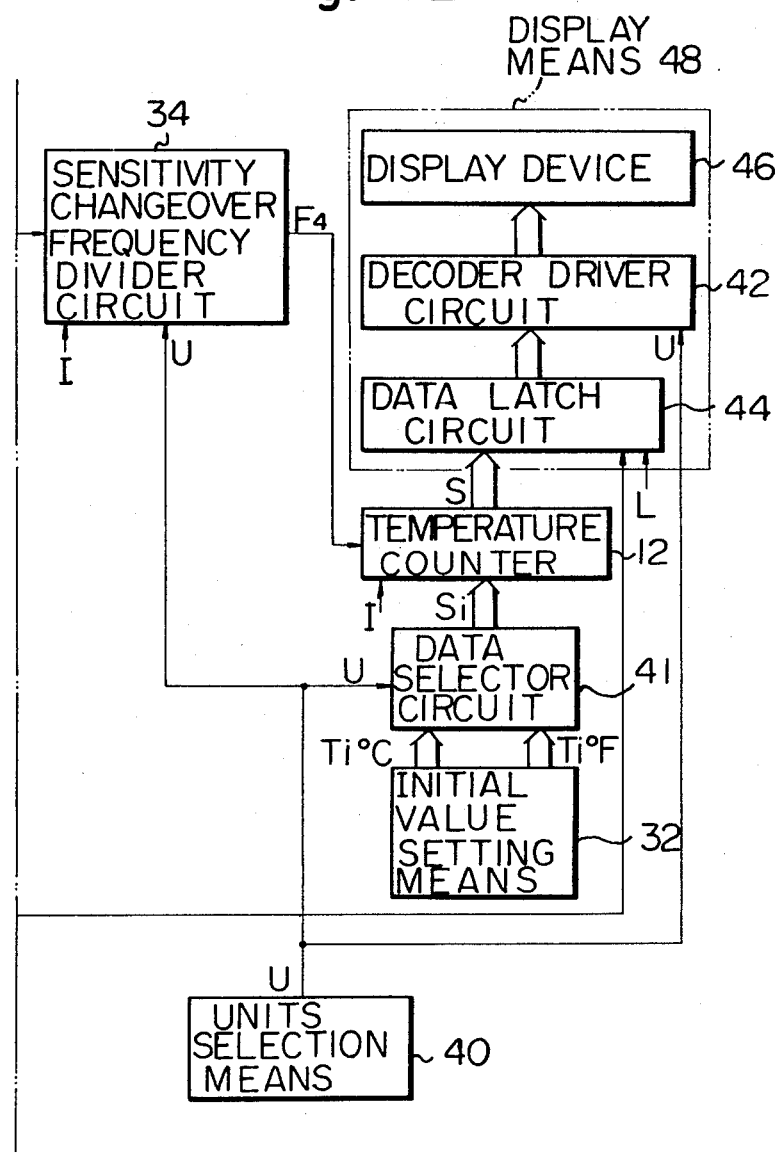
FIG. 11 is a block diagram in FIGS. 11A and 11B of a specific embodiment of the present invention.

As described in the above centigrade temperature T°C. and fahrenheit temperature T°F. can be respectively derived from the number of pulses N which are counted by a counter circuit having the characteristics shown by the straight line segment graphs of FIG. 8 and FIG. 9 respectively. However it is not economical to provide two separate counter circuits for counting fahrenheit temperature and centigrade temperature respectively, within the same thermometer. Thus, it is desirable to implement the functions of both of these counter circuits by a single counter circuit. FIG. 11 is a block circuit diagram of a specific embodiment of the present invention for achieving the latter objective. The block circuit diagram of FIG. 11 will be described in the following.

Numeral 6 denotes a CR oscillator circuit which can have the circuit shown in FIG. 1, having an input terminal P1 to which a control signal G is applied, and an output terminal P2 from which a pulse train signal F1 is output. Numeral 8 denotes a variable frequency divider circuit which performs frequency division of signal F1 by a frequency division ratio Kf whose value is determined by a division ratio setting data DX, variable frequency divider circuit 8 thereby producing signal F2 as output. The ratio of the frequency f1 of input pulse train signal F1 to the frequency f2 of the output pulse train signal F2 is determined by the frequency division ratio Kf as follows;

$$Kf = f2/f1 \quad [22]$$

Numeral 35 denotes a read-only memory (abbreviated in the following to ROM). This producs the division ratio setting data DX referred to above in response to the address data Ad being input thereto. Numeral 36 denotes an address frequency divider circuit. This performs frequency division of signal F2, and thereby produces a pulse train signal F3. Each time the temperature counter circuit of this embodiment changes in count contents by a predetermined amount, a pulse of signal F3 is produced. In other words, as described in the above, with referenc to FIG. 8 and FIG. 10, one pulse of signal F3 is output each time a change of amount equal to the constant A or B. Numeral 38 denotes an address counter circuit which counts pulses of signal F3 and thereby produces as count results the address data Ad. Numeral 34 denotes a sensitivity changeover frequency divider circuit, which performs frequency division of pulse train signal F2 by either the frequency division ratio Kc or Kf, as determined by a units selection signal U, to thereby produce a pulse train signal F4 as output.

Each pulse of signal F4 corresponds to one minimum unit of change in the measured temperature, and the number of pulses of signal F4 are counted to thereby derive a numeric value which represents the temperature. Numeral 12 denotes a temperature counter circuit, which counts pulses of signal F4 and thereby produces as output the count result S. The temperature counter circuit 12 can be preset to an initial value Si, supplied from data selector circuit 41. The data selector circuit 13 selects one of two values, Ti°C. and Ti°F., i.e. the initial value data which is produced from initial value setting means 32, with this selection being carried out in accordance with the units selection signal U, with data selector circuit 41 thereby producing as output an initial value Si for counter 12. Numeral 44 denotes a data latch circuit, which serves to memorize the count contents S from temperature counter circuit 12, and transmits S (while stored therein) to decoder driver circuit 42. The display device 46 is a liquid crystal or electroluminescent diode type of display device. In addition to displaying the count results S from temperature counter circuit 12 in digital form, display device 46 also serves to display the units of the temperature being currently indicated, and the decimal point, in accordance with the units selection signal U. Numeral 48 denotes display means, which in this embodiment comprise data latch circuit 44, decoder driver circuit 42, and display device 46.

Numeral 40 denotes units selection means, which comprise an externally actuated switch (not shown in the drawing), and a bistable circuit (also not shown in the drawing). The bistable circuit serves to produce the units selection signal U as a signal whose logic level is inverted on each of successive actuations of the switch. The units selection means 40 thereby serves to select either centigrade or fahrenheit temperature measurement units, under the control of manual switch actuations.

Numeral 33 denotes a circuit which serves to detect when the temperature being measured exceeds the temperature measurement range of the system, and will be referred to in the following as an overflow detection circuit. The circuit serves to detect when the measurement temperature range is exceeded, through the value of the address data Ad, and produces an overflow signal OVER when such a condition is detected. The latter signal is memorized in latch circuit 44, and is transferred to display device 46 through decoder driver circuit 42. An indication is thereby provided on the display when the measurement temperature range is exceeded.

Numeral 7 denoes a signal generating circuit, which comprises a quartz crystal oscillator circuit 27 producing a signal having a high level of frequency accuracy, a frequency divider circuit 28, and a timing circuit 7A.

Figure 12:
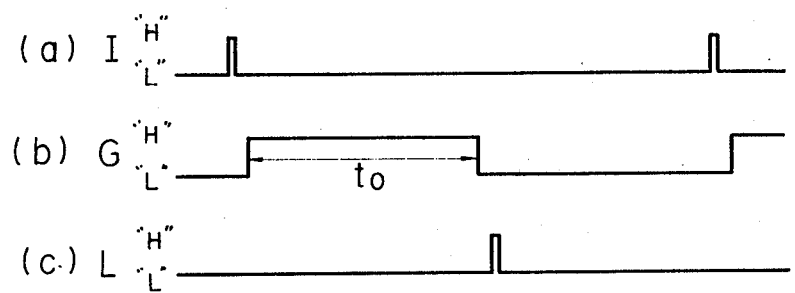
FIG. 12 are waveforms showing in FIGS. 12a, b, and c, timing signals.

Timing circuit 7A serves to produce three types of timing signal, for controlling each temperature measurement operation performed by the thermometer. The first of these timing signals is control signal G, for controlling CR oscillator circuit 6. This controls starting and stopping of oscillation by CR oscillator circuit 6, and also sets the duration of the fixed time interval t0 described in the above. The second timing signal is signal I, which functions as an initialization signal for initialization of counters 38 and 12 (used for temperature measurement) and frequency dividers 8, 36 and 34. This initialization is carried out prior to each temperature measurement operation. The third timing signal is a latch sampling signal L. This signal serves to update the memory contents of data latch circuit 44, and is produced at the end of each temperature measurement operation to store the newly measured data. The waveforms of these three timing signals, I, G and L, are shown in FIG. 12a, 12b, and 12c respectively.

The temperature measurement operations of this thermometer embodiment will now be described. Firstly, before a temperature measurement operations begins, the measurement units are selected by means of units selection signal U which is output from units selection circuit 40. Next, initialization signal I is output from timing circuit 7A, to thereby reset variable frequency divider circuit 8, address frequency divider circuit 36, address counter circuit 38, and sensitivity changeover frequency divider circuit 34. At the same time, the initialization value Si is preset into counter circuit 12, in response to initialization signal I, with this initialization value Si being selected to have a suitable value for the temperature measurement units being currently employed, this selection being performed by data selector circuit 41. More explicitly, when temperature measurement is being performed in centigrade units, a numeric value Ti°C. is output from initial value setting means 32 as the initial value Si, while when fahrenheit temperature measurement is to be performed, a numeric value Ti°F. is output from initial value setting means 32. Upon completion of circuit initialization, control signal G goes to the H level, whereupon CR oscillator circuit 6 commences operation, and pulse train signal F1 is output therefrom. At this time, the address data Ad which is output from address counter circuit 38 will designate address 0 of ROM 35, and as a result, the initial value X1 will be output from ROM 35 as division ratio setting data X. If the value of frequency division ratio Kf at this time is designated as K1, then the frequency of signal F2 from variable frequency divider circuit 8 will be equal to K1 times the frequency of signal F1, where K1 is less than 1. Signal F2 is frequency divided by address frequency divider circuit 36, to thereby produce signal F3. The frequency f3 of signal F3 is related to the frequency division ratio Ka of address frequency divider circuit 36 by the following equation:

$$f3 = Ka \cdot f2 = Ka \cdot K1 \cdot f1 \quad [23]$$

From equation 23 it can be seen that the number of pulses N1 of signal F1 equal to 1/(K1·Ka) will be produced before the first pulse of signal F3 is output. When a first pulse is thereby output from address frequency divider circuit 36, then that pulse is counted by address counter 38, whereby the address data Ad is advanced from address 0 to address 1. Due to this, the second set of frequency division ratio setting data X2 is output from ROM 35. If the frequency division ratio of frequency divider circuit 8 which results from the latter division ratio setting data is designated as K2, then the number of pulses N2 of signal F1 which are produced until the point when the frequency division ratio is changed to a new value K3 will be equal to 1/K2·Ka. Similarly, when subsequently the nth frequency division ratio Kn is established, the number of pulses Nn of signal F1 will have been input, with this number being equal to 1/Kn·Ka.

The number of pulses of signal F2 produced during each of the time intervals in which the numbers of pulses N1, N2, ... Nn are counted will always be equal to 1/Ka, as shown by equation 23. Thus, the cumulative total number of pulses N of signal F1 and the cumulative total number of pulses M of signal F2 are related by the straight line segment graph 50 of FIG. 13. The respective slopes of the straight line segments of this graph are expressed by the frequency division ratios K1, K2, ... Kn ..., while the rate of change of these slopes must be equal to the rate of change of the slope of the straight line segment graphs of FIG. 8 and FIG. 10.

Figure 13:
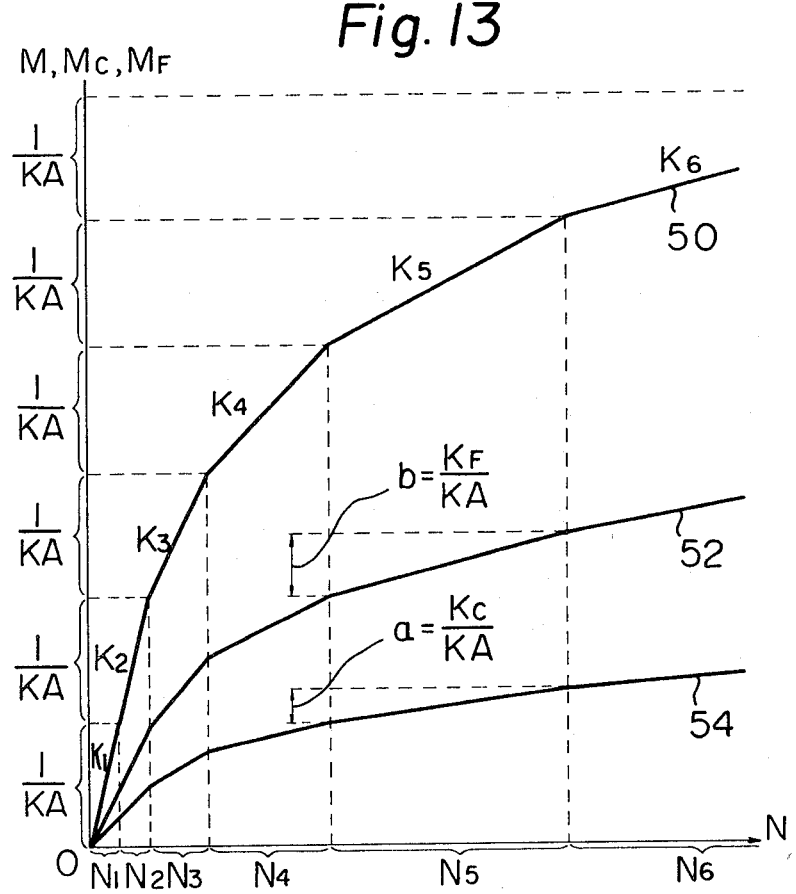
FIG. 13 is a graph showing cumulative pulse counts.

Pulse train signal F2 is frequency divided by sensitivity changeover frequency divider circuit 34, and pulse train signal F4 is thereby output from that circuit. The frequency division ratio of sensitivity changeover frequency divider circuit 34 is Kc in the case of centigrade temperature measurement, and is Kf in the case of fahrenheit temperature measurement. As a result, for every 1/Ka pulses of signal F2, Kc/Ka pulses of signal F4 are output in the case of centigrade temperature measurement, and Kf/Ka pulses of signal F4 are output in the case of fahrenheit temperature measurement. The cumulative pulse counts Mc and Mf of signal F4 (for centigrade temperature measurement and fahrenheit temperature measurement respectively) are Kc×M and Kf×M. The variations of the cumulative pulse counts Mc and Mf are shown in the straight line segment graphs 54 and 52 of FIG. 13 respectively. The change in the number of pulses counted corresponding to a single straight line segment in the graph 54 of FIG. 13 is Kc/Ka, while in the case of graph 52 of FIG. 13 it is Kf/Ka. As shown in FIG. 13, these values correspond to the constants A and B respectively, which are determined by the frequency division ratios Kc and Kf respectively.

Thus, if the values A=Kc/Ka, and B=Kf/Ka are inserted into equation 21, the following is obtained;

$$Kf/Kc = 9/5 \quad [24]$$

Thus for example if Kc=1/9, and Kf=1/5, then equation 24 will be satisfied.

The temperature counter circuit 12 serves to count the cumulative number of pulses Mc and Mf. As a result of the initial value Ti°C. or Ti°F., (depending upon the temperature measurement units) that has been set into temperature counter circuit 12, the count contents S in temperature counter circuit 12 will vary as shown by the straight line segment graph of FIG. 8 or FIG. 10 respectively. After fixed time interval t0 has elapsed, control signal G goes to the L logic level, so that CR oscillator circuit 6 ceases operation. The supply of pulses to variable frequency divider circuit 8 is thereby terminated. The count contents S in temperature counter circuit 12 at this time represents the temperature measurement value, and this count is memorized in data latch circuit 44 at a timing determined by latch signal L which is output from timing circuit 7A, while becoming displayed in digital form by display device 46.

The sequence of events described above, which constitute a temperature measurement operation, is repeated a periodic intervals, whereby continuously updated temperature measurement values are displayed.

A specific circuit for variable frequency divider circuit 8 will now be described briefly. Three methods of implementing such a variable frequency divider circuit are possible. The first of these comprises a presettable down counter and a zero detection circuit. After setting the division ratio setting data DX into the presettable down counter, down counting is performed thereby until the count contents reach zero. When this is detected, the data DX is once more preset into the counter. These operations are repetitively performed. With such a method, the frequency division ratio Kx will be given by the following equation:

$$Kx = 1/DX \quad [25]$$

A second method of implementing variable frequency divider circuit 8 is to use a counter circuit and a numeric value coincidence detection circuit. When coincidence between the count contents and the division ratio setting data X is detected, then the counter is reset to zero and counting is resumed. This sequence of operations is repetitively performed. The frequency division ratio Kx in this case is also given by equation 25 above.

A third method of implementing such a variable frequency divider circuit is to use a rate multiplier circuit. The basic principles of operation of a rate multiplier circuit are well known in the art, being described for example in the "TTL Applications Manual" published by Texas Instruments Asia Ltd, in chapter 13 thereof.

Description of such a circuit will therefore be omitted. An 8-bit rate multiplier circuit configuration is suitable for use in a domestic typ of thermometer according to the present invention. In this case, the frequency division ratio Kx is related to the division ratio setting data X (input as an 8-bit binary number to the rate data input terminals), by the following equation:

$$Kx = X/256 \quad [26]$$

As can be seen from equation 26, use of a rate multiplier circuit for a variable frequency divider circuit has the advantage that the frequency division ratio Kx can be set in a linear manner, and for this reason such a circuit is most suitable for use as the variable frequency divider circuit in this embodiment of the present invention.

Figure 14:
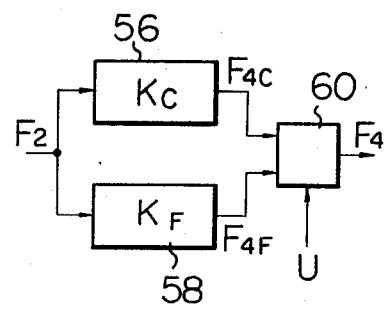
FIG. 14 is a circuit diagram of the sensitivity changeover frequency divider circuit 34 of FIG. 11.

A specific configuration for sensitivity changeover frequency divider circuit 34 will now be described. In the embodiment of FIG. 11, if the temperature measurement units used for fahrenheit and centigrade temps are both assumed to be 1 degree units, or 0.1 degree units, then the relationships between the two frequency division ratios Kc and Kf of sensitivity changeover frequency divider circuit 34 are given by equation 24. FIG. 14 is a circuit diagram of an example of sensitivity changeover frequency divider circuit 34 which will satisfy the conditions of equation 24. In this embodiment, 56 and 58 are frequency dividers which have the desired frequency division ratios Kc and Kf respectively, and which produce as output signals F4 c and F4 f respectively. One of these output signals is selected by AND-OR gate circuit 60, under the control of units selected signal U, to be output as pulse train signal F4. If the measurement units are assumed to be 0.1° C. and 0.1° F., then the simplest circuit configuration will be achieved by using frequency division ratios Kc and Kf of 1/9 and 1/5 respectively. If on the other hand the frequency division ratios Kc and Kf are made to be 1/9 and 1/50, respectively, then the measurement units will be 0.1° C. for centigrade measurement, and 1° F. for fahrenheit measurement, for the circuit of FIG. 11.

Figure 15:
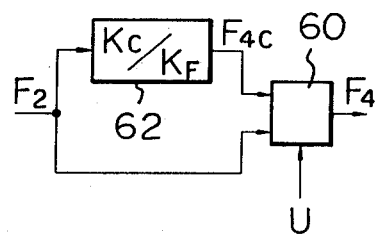
FIG. 15 shows another embodiment of the sensitivity changeover frequency divider circuit.

FIG. 15 shows another embodiment of sensitivity changeover frequency divider circuit 34. In this example, a frequency divider circuit 62 is provided, which has a frequency division ratio of Kc/Kf. During centigrade temperature measurement, the output signal F4c from frequency divider circuit 62 is selected by AND-OR gate circuit 60 under the control of units selection signal U to be output as signal F4, while during fahrenheit temperature measurement, signal F2 is selected by AND-OR gate circuit 60 to be output as signal F4. If the units used for both fahrenheit and centigrade temperature measurement are 1 degree or 0.1 degree units, then the frequency division ratio Kc/Kf of frequency divider circuit 62 is 5/9. Such a frequency divider circuit 62 can be easily implemented by using a base-9 rate multiplier circuit, with numeric value 5 being input as the rate data input.

Figure 16:
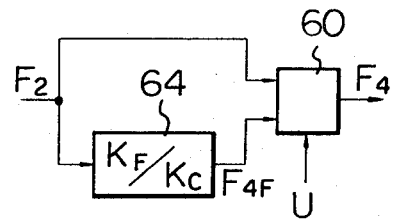
FIG. 16 shows still another embodiment of the sensitivity changeover frequency divider circuit.

FIG. 16 shows another embodiment of sensitivity changeover frequency divider circuit 34. This comprises a frequency divider circuit 64 which has a frequency division ratio of Kf/Kc, and an AND-OR gate circuit 60 which is controlled by units selection signal U. In this embodiment, during centigrade temperature measurement, pulse train signal F2 is directly transferred to be output as signal F4, while during fahrenheit temperature measurement, the output signal F4 f from frequency divider circuit 64 is output as signal F4. With the frequency division ratio Kf/Kc assumed to be 9/50, the centigrade and fahrenheit temperature measurement units will be set as 0.1° C. and 1° F. respectively. The frequency divider circuit 64 can be implemented by a base-50 rate multiplier circuit, with a numeric value 9 being fixed as the rate multiplier data input.

Figure 17:
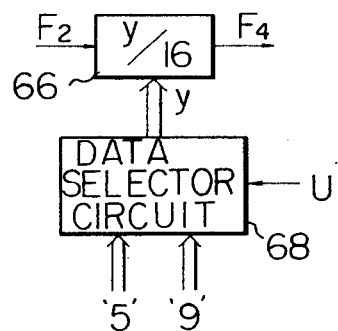
FIG. 17 is another modification showing of the sensitivity changeover frequency circuit.

FIG. 17 shows another embodiment of sensitivity changeover frequency divider circuit 34. This comprises a base-16 rate multiplier circuit 66, which receives rate input data Y from data selector circuit 68 under the control of units selection signal U. In this embodiment, the rate input data Y is the numeric value 5 in the case of centigrade temperature measurement, and is 9 in the case of fahrenheit temperature measurement. Both the centigrade and fahrenheit temperatures can be measured in 1 degree or 0.1 degree units, in this case.

A specific configuration for address frequency divider circuit 36 will now be described. In the block circuit diagram of FIG. 11, clock signal F2 is shown as being input to address frequency divider circuit 36. However the basic function of frequency divider circuit 36 is to count the number of pulses of signal F2 which correspond to a fixed temperature range. Thus, any pulse train signal can be input to this frequency divider circuit so long as that signal has a frequency which is directly proportional to that of signal F2. For example as shown in the circuit of FIG. 14, the address frequency divider circuit can receive as input signals F4c or F4f from frequency divider circuit 56 or 58 respectively, which constitute a sensitivity changeover frequency divider circuit. In this case, if each pulse of signal F4 is assumed to correspond to 1° C., and if the address frequency divider circuit has a frequency division ratio Ka and receives signal F4 as input signal, then each pulse of the output signal from the address frequency divider circuit will correspond to 1/Ka°C. Thus if the frequency divider circuit Ka has a value of 1/5, then the approximation steps of the straight line segment graph shown in FIG. 8 will be equal to 5° C. increments.

Similarly if it is assumed that each pulse of signal F4f corresponds to 1° F., and that this signal F4f is input to an address frequency divider circuit which has a frequency division ratio of Ka, then each pulse of the output signal from this address frequency divider circuit will represent 1/Ka°F. In this case if the frequency division ratio Ka has a value of 1/5, then each of the approximation steps will be equivalent to a 5° F. increment in temperature. In a similar way, either of the output signals F4c and F4f from frequency dividers 62 and 64 in the sensitivity changeover frequency divider circuit circuits of FIG. 15 and FIG. 16 can be used as the input signal to the address frequency divider circuit. It is also possible to extract a signal from an intermediate frequency divider stage of any of the frequency divider circuits 56,58 or 64, and to use this as the input signal to the address frequency divider circuit. These frequency divider circuits 56, 58, 62 and 64 can consist of rate multiplier circuits, and in that case it is possible to use the rate multiplier carry signal as the input signal to the address frequency divider circuit.

Figure 18:
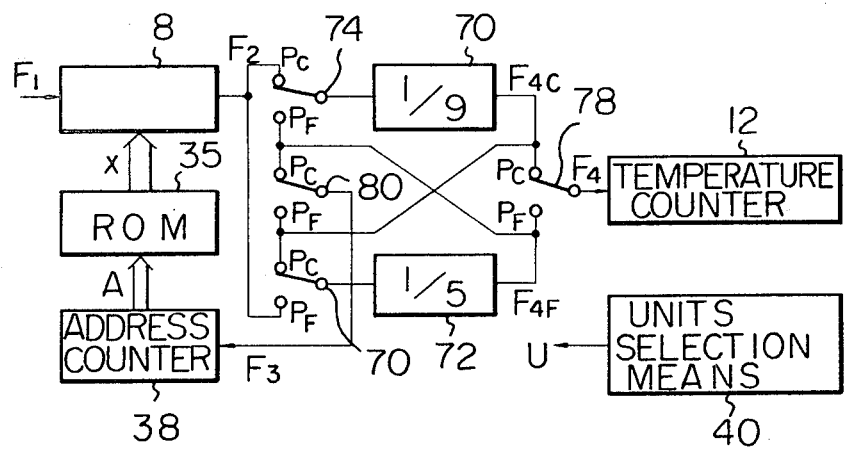
FIG. 18 is a circuit diagram of a multi-purpose frequency divider circuit.

FIG. 18 is a circuit diagram of a multi-purpose frequency divider circuit, which performs the functions of both address frequency divider circuit 36 and sensitivity changeover frequency divider circuit 34 of the embodiment of FIG. 11. Such a circuit is highly suitable for implementing a thermometer according to the present invention to provide changeover between fahrenheit and centigrade displays of temperature. In FIG. 18, variable frequency divider circuit 8, ROM 35, address counter 38, temperature counter 12 and units selection circuit 40 corresponds to the circuit blocks having corresponding numerals shown in FIG. 11, and further description will therefore be omitted. In addition, since the CR oscillator circuit, data selector circuit 41, data latch circuit 44, display device 46, overflow detection circuit 33, signal generating circuit 7 and initial value setting means 32 have no relation to the following description, they are omitted from FIG. 18.

In FIG. 18, numerals 70 and 72 denote frequency dividers which have frequency division ratios of 1/9 and 1/5 respectively. These correspond to frequency dividers 56 and 58 shown in the circuit of FIG. 14, and their output signals are designated respectively as F4c and F4f. Numerals 76, 78 and 80 respectively designate signal switching circuits. Each of these circuits is controlled by the units selection signal U which is output from units selection circuit 40, to select one of two signals which are input thereto. Such signal switching circuits 76, 78 and 80 are generally formed, in practice, by groups of AND-OR gate circuits. However for ease of description, the are shown in the diagram as each comprising two contact points Pc and Pf, forming part of a switch. When centigrade temperature measurement is designated by units selection signal U, then contact Pc of each switch is closed, while when fahrenheit temperature measurement is designated, then contact Pf of each switch is closed.

The operation of this circuit is as follows. Pulse train signal F1 output from CR oscillator circuit 6 is frequency divided by variable frequency divider circuit 8, which thereby produces pulse train signal F2. This signal is applied to contact Pc of signal switching circuit 74, and to contact Pf of signal switching circuit 76. The signal switching circuit 74 contact Pf and contact Pc of signal switching circuit 76 are thereby respectively coupled to output signal F4f from frequency divider circuit 72 and signal F4c from frequency divider circuit 70, while the output signals from signal switching circuit 74 and 76 are applied as input signals to frequency divider circuit 70 and 72. The output signal F4c from frequency divider circuit 70 is coupled to contact Pc of signal switching circuit 76, and also to contact Pc of signal switching circuit 78 and contact Pf of signal switching circuit 80. The output signal F4f from frequency divider circuit 72 is coupled to contact Pf of signal switching circuit 74, and also to contact Pf of signal switching circuit 78 and contact Pc of signal switching circuit 80. The output signal from signal switching circuit 78 is pulse train signal F4, which is input to temperature counter 12. The output signal from signal switching circuit 80 is pulse train signal F3, which is input to address counter 38. As the count in address counter 38 advances, address data Ad is updated, whereby new values for division ratio designating data DX are read out of ROM 8.

When centigrade temperature is to be measured, the units selection signal U acts to set the contact points Pc of all of signals switching circuits 74, 76, 78 and 80 to the closed state. As a result, pulse train signal F2 is trasferred through signal switching circuit 74 be input to frequency divider circuit 70, and is thereby frequency divided by 1/9, to become signal F4c. Each pulse of signal F4c corresponds to 1° C.

Signal F4c is transferred through signal switching circuit 78 to be input to temperature counter circuit 12 as pulse train signal F4, and is transferred though signal switching circuit 76 to be input to frequency divider circuit 72 and subjected therein to frequency division by a factor 1/5. As a result, each pulse of the output signal from frequency divider circuit 72 corresponds to 5° C., and this signal is transferred through signal switching circuit 80, to be input as signal F3 to address counter 38. In this way, temperature counter circuit 12 is advanced in units of 1° C., while address counter 38 is advanced in units of 5° C.

In the case of fahrenheit temperature measurement, units selection signal U acts to set all of the contacts Pf of all of signal switching circuits 74, 76, 78 and 80 to the closed state. As a result, pulse train signal F2 is transferred through signal switching circuit 76 to be input to frequency divider circuit 72, and is thereby frequency divider circuit by factor 1/5, to become signal F4f. Each pulse of signal F4f corresponds to 1° F., and this signal is transferred through signal switching circuit 78 to be input as pulse train signal F4 to temperature counter circuit 12, and is transferred through signal switching circuit 74 to be input to frequency divider circuit 70, and subjected therein to frequency division by factor 1/9. Thus, the output signal from frequency divider circuit 70 is such that each pulse thereof corresponds to 9° F. (equivalent to 5° C.), and this signal is transferred through signal switching circuit 80 to be input as pulse train signal F3 to address counter 38. In this way, temperature counter circuit 12 is advanced in 1° F. units, while address counter 38 is advanced in 9° F. units, i.e. in steps of 5° C.

In this way, by using the circuit of FIG. 18, both centigrade and fahrenheit temperature measurement operations are accomplished, with the address counter 38 being advanced in steps of 5 C.° in each case, while the address frequency divider circuit in the embodiment of FIG. 11 can be eliminated.

It can be understood from the above description that such an electronic digital thermometer can be manufactured at very low cost. In addition, as can be understood from the above embodiments, circuit elements other than a trimmer capacitor used as frequency adjustment means for the CR oscillator circuit, a quartz crystal vibrator used to produce a standard frequency signal, the liquid crystal display device and the battery, can comprise digital logic elements. Thus, such a thermometer can be very easily implemented by using an integrated circuit. If this is a CMOS IC, then the power consumption can be very low, and so a very small size of battery can be used as a power source. Thus, in addition to a thermometer according to the present invention being capable of replacing prior art types of lightweight thermometers such as glass or bimetal thermometers, it is also suitable for application to various new fields. For example, by providing such a thermometer in an electronic timepiece, it is possible to arrange that ambient temperature is measured and memorized at a fixed time each day. It would also be possible to produce a timepiece which measures the maximum and minimum temperatures each day, and which memorizes these temperatures together with the times at which they were measured. Furthermore, with a thermometer according to the present invention, it is possible to derive temperature data in digital form and to use this data to perform temperature compensation of an electronic timepiece, to improve the timekeeping accuracy.

In addition, since a thermometer according to the present invention can be made very small and easy to use, it could also be used as a clinical thermometer, for example. A thermometer according to the present invention would also be highly suitable for temperature measurement for various technical and scientific applications, or could be built into medical equipment.

In addition, as shown by the second embodiment above, such a thermometer can be easily arranged to display both centigrade and fahrenheit temperatures, thereby further extending the possible range of applications.

Although the present invention has been described in the above with respect to specific embodiments, it should be noted that various changes to these embodiment may be envisaged, which fall within the scope claimed for the present invention. The above description should therefore be interpreted in a descriptive and not in a limiting sense.

What is claimed is:
1. A thermistor thermometer, comprising:
a capacitance-resistance oscillator circuit comprising a frequency-determining time constant circuit including a thermistor;
signal generating circuit means for producing a plurality of signals including a control signal coupled to said capacitance-resistance oscillator circuit for controlling said capacitance-resistance oscillator circuit such as to operate only during repetitively occurring oscillation time intervals, each of said oscillation time intervals being of fixed duration;
variable division ratio frequency divider circuit means capable of being present to a plurality of different frequency division ratios, coupled to receive and perform frequency division of an oscillation signal produced by said capacitance-resistance oscillator circuit during each of said oscillation time intervals, for thereby producing a frequency divided output signal;
counter circuit means for counting pulses of said output signal from said variable division ratio frequency divider circuit means, and responsive to said counting for producing signals representing address data and temperature data, said address data being changed to a different value each time the number of pulses output from said vfo circuit means increases by a predetermined fixed amount, and said temperature data being cumulatively increased during said oscillation time interval in accordance with a cumulatively increasing count of the number of output pulses from said variable division ratio frequency divider circuit means;
division ratio setting means coupled to control the frequency division ratio of said variable division ratio frequency divider circuit, and responsive to said address data for setting said frequency division ratio to a corresponding one of a plurality of frequency division ratios in accordance with the value of said address data;
initial value setting means for setting an initial value for said temperature data into said count circuit means prior to each of said oscillation time intervals, in response to a timing signal from said signal generating circuit means;
display means comprising latch circuit means coupled to said counter circuit means and responsive